July 18, 1967  C. NORTON  3,331,350
POSITION INDICATOR

Filed Sept. 29, 1964  2 Sheets-Sheet 1

Inventor
Calhoun Norton
By: Olson, Trexler, Wolters & Bushnell
attys

July 18, 1967 C. NORTON 3,331,350
POSITION INDICATOR
Filed Sept. 29, 1964 2 Sheets-Sheet 2
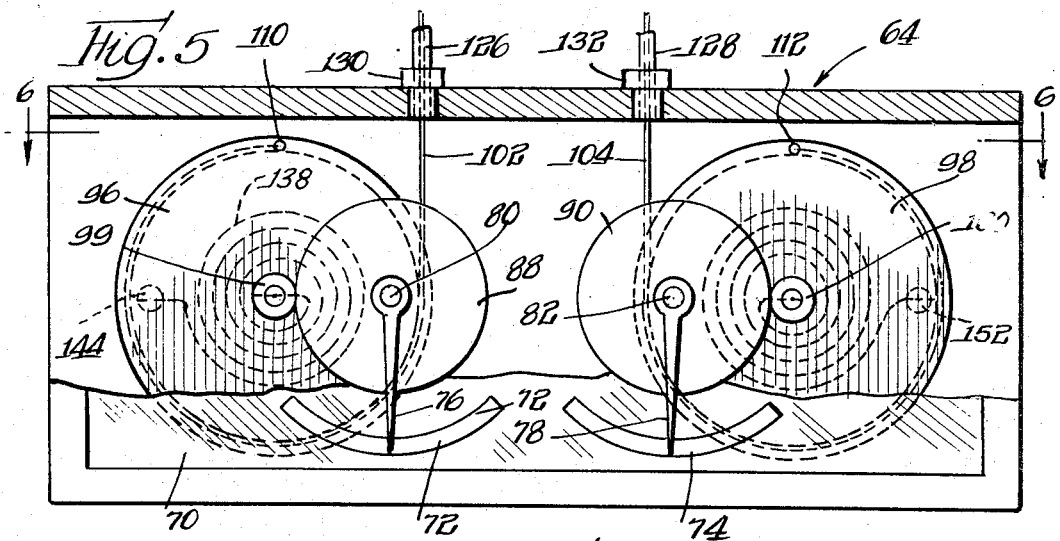
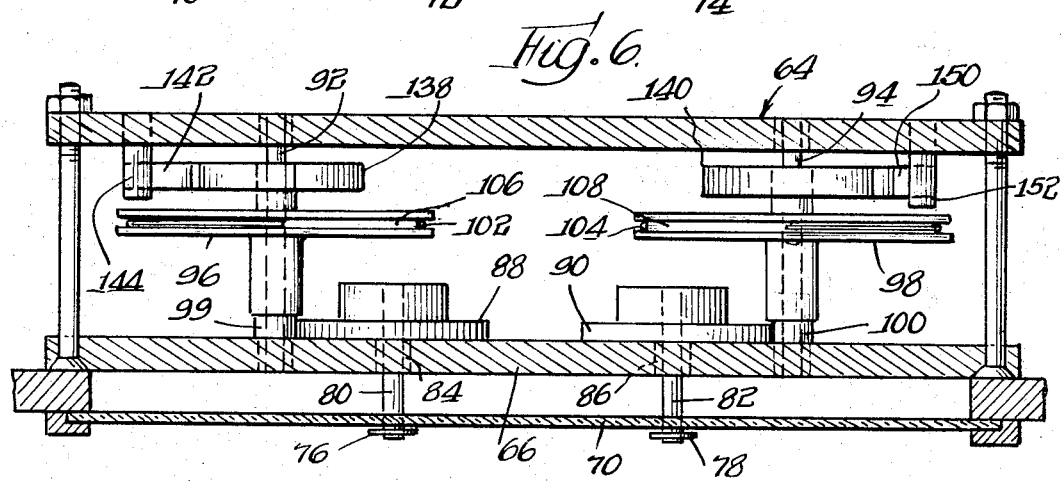
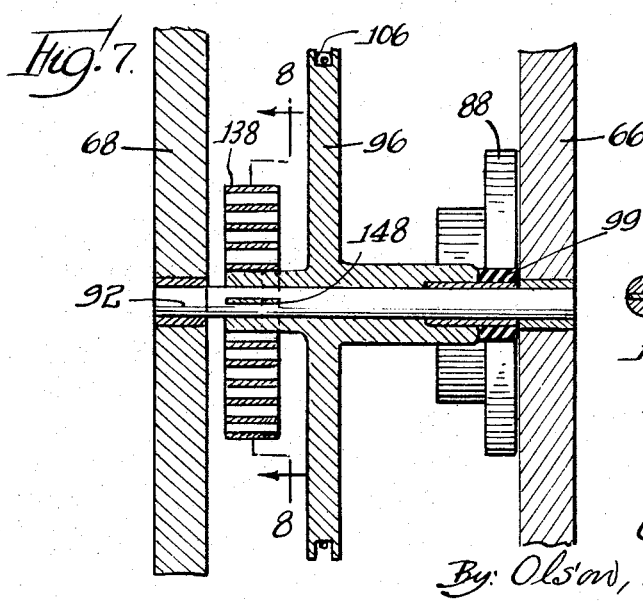
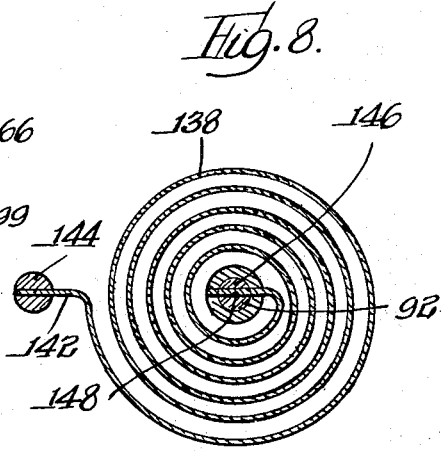
Inventor
Calhoun Norton
By: Olson, Trexler, Wolters & Bushnell
attys.

3,331,350
POSITION INDICATOR
Calhoun Norton, Glenview, Ill.
(2017 Greenleaf St., Evanston, Ill. 60202)
Filed Sept. 29, 1964, Ser. No. 400,098
6 Claims. (Cl. 116—31)

The present invention relates to a novel position indicating mechanism.

While various uses for indicating mechanisms of the type contemplated herein may suggest themselves, the present disclosure will be facilitated by describing the indicating mechanism as installed in a boat for showing the position of steering control means of the boat. As will be understood, there are times such as during starting of a boat when the operator does not know the position of the steering element of the boat whether such steering element be a rudder of an inboard boat or the movable drive unit of an inboard-outboard system or a conventional outboard motor. Furthermore, when dual drive units are used and are adapted to be turned relative to each other in the manner described in my copending application, now Patent No. 3,294,054, it is difficult for an operator to determine the precise angular relationship between the drive units.

It is an important object of the present invention to provide a novel indicator mechanism for enabling an operator to determine the precise position of a shiftable element such, as for example, the steering element of a boat.

A more specific object of the present invention is to provide a novel position indicating mechanism which may be easily and economically installed in either new or existing installations.

A further important object of the present invention is to provide a novel indicating mechanism constructed so as to eliminate substantially all backlash within the mechanism whereby the mechanism provides a highly accurate indication of the position of the element with which it is operatively connected.

Still another object of the present invention is to provide a novel indicating mechanism constructed for showing the relative positions of a plurality of movable elements.

A further object of the present invention is to provide a novel indicating mechanism having means adapted to be read by an operator at one location and being adapted to be easily mechanically connected to a shiftable element at a remote location.

Other objects and advantages of the present invention will become apparent from the following description and the accompanying drawings wherein:

FIG. 1 is a simplified plan view showing a boat having an indicating mechanism constructed in accordance with the features of the present invention installed therein;

FIG. 2 is an enlarged fragmentary partially schematic view showing an indicating mechanism incorporating features of the present invention;

FIG. 3 is an enlarged fragmentary sectional view taken generally along line 3—3 in FIG. 1;

FIG. 4 is a fragmentary perspective view of a portion of the structure shown in FIG. 3;

FIG. 5 is an enlarged side elevational view of the indicating mechanism taken along 5—5 in FIG. 1;

FIG. 6 is a sectional view taken along line 6—6 in FIG. 5;

FIG. 7 is an enlarged fragmentary sectional view taken along line 7—7 in FIG. 5; and FIG. 8 is a fragmentary sectional view taken along line 8—8 in FIG. 7.

Referring now more specifically to the drawings wherein like parts are designated by the same numerals throughout the various figures, an indicating mechanism 10 incorporating features of the present invention is shown in FIG. 1 installed in a boat 12. For the purpose of illustrating the present invention the boat 12 may have dual power plants and throttle and steering controls therefor as described in my above-mentioned copending application.

While it is not necessary to describe the power plants and steering controls of the boat 12 in detail herein, reference being made to the aforementioned copending application for a complete disclosure, it is observed that the boat 12 includes twin engines 14 and 16 of an inboard type which are connected with outboard drive units 18 and 20. The outboard drive units are of known construction and are adapted to be pivoted about upstanding axes 22 and 23 for turning the propeller shafts of the drive units about these axes and relative to the longitudinal axis of the boat thereby steering the boat.

In order to turn the drive units 18 and 20, levers 24 and 26 are respectively secured thereto, which levers are in turn connected by push-pull cables 28 and 30 which extend through guide conduits 32 and 34 to a steering mechanism 38 at a control station 40 of the boat.

As shown in FIGS. 1, 3 and 4, the control mechanism 38 comprises a steering wheel 42 having a plurality of radially extending spokes 44 and a manually operable lever 46. The lever 46 carries means such as a clip 48 cooperable with the spokes 44 for releasably locking the lever 46 to the wheel 42 for the purpose described more fully in the aforementioned copending application.

The wheel 42 is fixed on a rotatable shaft 50 supported in a bearing 52 while the lever 46 is fixed on a shaft 54 which extends through and is rotatable within the hollow shaft 50. Pinions 56 and 58 are respectively fixed on the outer and inner shafts 50 and 54 and mesh with axially reciprocable rack members 60 and 62 respectively. The rack member 60 is connected with the push-pull cable 30 and the rack member 62 is connected with the push-pull cable 28.

With the control mechanism 38 described above, it will be observed that the manually operable control members 42 and 46 may be turned in unison for simultaneously turning the drive units 18 and 20. Furthermore, the clip 48 may be released from the wheel 42 for enabling the wheel and the lever 46 to be turned relative to each other. Of course this enables the drive units 18 and 20 to be turned relative to each other so that the drive units may be selectively arranged in parallel relationship as shown in FIG. 1 or they may be turned at angles with respect to each other. For example the drive units 18 and 20 may be turned inwardly so that their propeller shafts extend at angles of about 45 degrees to the longitudinal axis of the boat and 90 degrees with respect to each other for enabling the boat to be steered by changing the speed and direction of the rotation of the propellers as discussed more fully in the aforementioned copending application.

It is frequently difficult for an operator to determine the angular relationship of the drive units 18 and 20 both with respect to each other and with respect to the longitudinal axis of the boat. Thus the indicating mechanism 10 of the present invention is provided for enabling the operator to determine quickly, easily and accurately, the position of the drive units.

The indicating mechanism 10 comprises a unit 64 adapted to be mounted at any convenient location such as at the control station 40. The unit 64 includes spaced apart walls or frame members 66 and 68. A face member or dial 70 is mounted forwardly of the wall 66 and is provided with suitable indicia or scales 72 and 74 for aiding in indicating the position of the drive units. Pointers 76 and 78 are mounted on shafts 80 and 82 rotatably supported in bearings 84 and 86 in the wall 66. The shafts 80 and 82 extend through the wall 66 and have rotary drive members 88 and 90 secured to inner ends thereof. The drive members 88 and 90 are, in the embodiment shown, discs formed from rubber or other suitable friction material for providing a friction drive which eliminates backlash, but the drive elements 88 and 90 could be in the form of gears, if desired.

Additional shafts 92 and 94 are mounted between the walls 66 and 68 and rotatably carry pulleys 96 and 98 which are adapted to be urged in opposite directions in accordance with and in response to the movement of the steering control mechanism as will be described below. Friction drive elements 99 and 100 are also on the shafts 92 and 94 and are connected for rotation in unison with the pulleys 96 and 98 respectively. The drive elements 99 and 100 are, in the embodiment shown, friction drive elements which engage and drive the members 88 and 90 so that the pointers 76 and 78 are turned in accordance with any movement of the pulleys 96 and 98. Of course the drive elements 99 and 100 could also be formed as gear elements, if desired.

As shown best in FIG. 2, the pulleys 96 and 98 are respectively connected with the drive units 18 and 20 by elongated flexible tension accommodating elements 102 and 104. The flexible tension accommodating and motion transmitting elements 102 and 104 are preferably formed from material having a low coefficient of friction or self-lubricating characteristics for promoting efficient, easy and accurate operation of the indicating mechanism. For example, the elements 102 and 104 are preferably in the form of nylon thread.

As shown best in FIGS. 5 and 6, the elements or threads 102 and 104 have end portions extending in peripheral grooves 106 and 108 in the pulleys and secured to the pulleys by fasteners 110 and 112. In the embodiment shown, opposite ends of the tension accommodating elements or threads 102 and 104 are interconnected with the drive units 18 and 20 through the push-pull cables 28 and 30 respectively. More specifically, the cables respectively extend through the rack members 60 and 62 and shown in FIG. 2 and are fixed with respect to the rack members by pairs of nut elements 114–116 and 118–120 at opposite ends of the rack members. The threads 102 and 104 are respectively fixed to free ends of the cables 28 and 30 by fittings 122 and 124.

The threads 102 and 104 are suitably guided and supported so that movements of the push-pull cables 28 and 30 are accurately transmitted to the pulleys 96 and 98. More specifically, the threads 102 and 104 extend through and are guided by tubes or conduits 126 and 128 having internal bores similar to but slightly greater than the diameter of the threads so that the threads are closely confined but freely slidable therein. The guide tubes or conduits are also preferably made from a material having a low coefficient of friction or self-lubricating characteristics such as nylon. First ends of the tubes 126 and 128 are connected by fittings 130 and 132 to the housing of the unit 64 while opposite ends of the tubes are supported in axial alignment with the cables 28 and 30 and the racks 60 and 62 respectively by brackets 134 and 136.

The tubes 126 and 128 and the threads therein may have numerous rounded corners or bends therein. However, the ends of the tubes secured by the fittings 130 and 132 have their axes tangent to the peripheries of the pulleys 96 and 98, and, as previously indicated, the opposite ends of the tubes are in axial alignment with the cables 28 and 30.

While the threads 102 and 104 are adapted to accommodate tension and to pull the pulleys in first directions, the threads are not necessarily adapted to accommodate compression loads and are not intended to function to push the pulleys in the opposite or return direction. In order to urge the pulleys in the return direction, means are provided for continuously yieldably biasing the pulleys in opposition to the pull of the threads 102 and 104.

More specifically, torsion springs 138 and 140 are associated with the pulleys 96 and 98 respectively as shown in FIGS. 6, 7, and 8, the torsion spring 138 has a first end 142 secured to an anchor pin 144 fixed in the wall 68. An opposite end 146 of the torsion spring 138 extends into aperture means 148 in and is thereby anchored to the pulley 96 and the shaft 92. The spring 140 is mounted and secured in essentially the same manner and has a first end 150 connected to an anchor pin 152 and an opposite end fixed to the hub of member 98 and shaft 94. The springs 138 and 140 not only bias the pulleys 96 and 98 in a return direction, but also serve to maintain the threads or flexible elements 102 and 104 under substantial tension at all times and thereby completely eliminate any backlash or lost motion between the pulleys and the control elements of the steering system to which the indicator mechanism is connected. Thus, all movements of these control elements are accurately transmitted to the pointers 76 and 78 to provide an operator with instantaneous and reliable indication of the position of the drive units 18 and 20.

While a preferred embodiment of the present invention has been shown and described herein, it is obvious that many structural details may be changed without departing from the spirit and scope of the appended claims for example, as previously indicated, the indicator mechanism may be installed in a variety of structures other than boats. Furthermore, there are many instances where there is only a single shiftable element to be considered and in such instances the indicator mechanism may be modified by eliminating one of the pointers and its associated pulley and connecting elements.

The invention is claimed as follows:

1. In a machine including an adjustable member, a mechanism removably positioned from said adjustable member for indicating the position of said adjustable member, said mechanism comprising first means, a support mounting said first means for back and forth movement, an elongated flexible element connected with said first means and with said member for positively pulling said first means in one direction in accordance with the position of said member, guide means extending between said first means and said member and supporting and guiding said flexible element, and spring means connected with said first means for continuously and yieldably biasing said first means and thus said element in another direction and eliminating any possibility of lost motion between said first means and said element, and means associated with and responsive to the position of said first means for indicating the position of said first means and of said member.

2. In a machine such as a boat including an adjustable member, a mechanism removably positioned from said member for indicating the position of said adjustable member, said mechanism comprising first circular means support means mounting said first means for back and forth rotary movement, a flexible tension accommodating element connected with and extending partially around a peripheral surface of said first means, said flexible element also extending generally tangentially away from said peripheral surface and being connected with said member for pulling said first means in one direction in response to movement of said member, a guide conduit extending between said first means and said member and slidably receiving and supporting said flexible element, and a spring connected with said first means for continuously and yieldably rotatively biasing said first means in an opposite direction and thereby continuously maintaining said element under tension and eliminating any possibility of lost motion between said first means and said element, and means associated with and respsonsive to the position of said first means for indicating the position of said first means and thus said member.

3. A mechanism, as defined in claim 2, wherein said last named means comprises a shiftably mounted pointer, and rotary drive elements between and operatively connecting said first means and said pointer.

4. A mechanism, as defined in claim 3, wherein said rotary drive elements comprise first and second elements respectively coupled to said first means and to said pointer, said first and second elements being in frictional driving engagement with each other.

5. In a machine including a plurality of relatively adjustable members, a mechanism remotely positioned from said members for indicating the relative position of a plurality of said adjustable members said mechanism comprising a plurality of first means respectively associated with said adjustable members, a support structure mounting said first means for back and forth movements, a plurality of flexible tension accommodating elements respectively fixedly connected to said plurality of first means and with the adjustable member respectively associated with each of the first means for pulling each of said first means in one direction in accordance with the position of its associated adjustable member, spring means respectively connected to said first means for continuously and yieldably biasing each of said first means and thus its associated element in another direction and for eliminating any possibility of lost motion between said first means and their associated elements, and a plurality of means respectively associated with and responsive to the positions of each of said first means for indicating the positions of each of said first means and thus the adjustable members associated with each of said first means.

6. A control system for a boat having two separately movable steering members, comprising a first rotatable control member at a control station operatively connectable to one steering member for turning said one steering member, a second turnable control member at said control station operatively connectable to a second steering member for turning said second steering member, first and second pulley members rotatably mounted adjacent said control station, flexible tension accommodating elements respectively fixedly connected with and extending partially around peripheral surfaces of said first and second pulley members, said elements also extending generally tangentially from said peripheral surfaces and being connected with said first and second control members for positively rotatively pulling said pulley members in one direction in response to movement of said control members, first and second spring elements respectively connected with the first and second pulley members for resiliently rotatively biasing said pulley members in an opposite direction and continuously maintaining said tension accommodating elements under tension and eliminating any possibility of lost motion between said tension accommodating elements and said pulley members, and means associated with and responsive to the positions of said pulley members for indicating the position of said pulley members and thus the positions of said control members and said steering members.

References Cited

UNITED STATES PATENTS

| 1,110,737 | 9/1914 | Benham et al. | 116—31 |
| 1,170,633 | 2/1916 | Guinand | 116—31 |
| 1,434,148 | 10/1922 | Price | 116—31 |
| 1,526,260 | 2/1925 | Vinnemeier | 116—31 |
| 1,767,584 | 6/1930 | Hammer | 74—480 |
| 2,134,299 | 10/1938 | Cosner | 116—39 |
| 2,439,476 | 4/1948 | Leggett et al. | 116—31 |
| 2,757,553 | 8/1956 | Marr | 74—480 |
| 2,890,595 | 6/1959 | Loeffler | 74—480 |
| 2,891,498 | 6/1959 | Schroeder | 74—480 |
| 2,895,445 | 7/1959 | Foroker | 74—480 |
| 2,968,192 | 1/1961 | Fletcher | 74—480 |
| 3,050,025 | 8/1962 | Atkeson | 114—144 |
| 3,088,431 | 5/1963 | Brownshield | 116—31 |
| 3,181,491 | 5/1965 | Dunning | 116—31 |
| 3,206,998 | 9/1965 | Matz et al. | 74—480 |

LOUIS J. CAPOZI, *Primary Examiner.*